LEGEND:
ROUNDED CORES IN FRONT PLANE 10
RECTANGULAR CORES IN BACK PLANE 12

INVENTOR
JAMES E. THORNTON
BY Cushman, Darby & Cushman
ATTORNEYS

INVENTOR
JAMES E. THORNTON

BY Cushman, Darby & Cushman

ATTORNEYS

INVENTOR
JAMES E. THORNTON

BY Cushman, Darby & Cushman
ATTORNEYS

United States Patent Office 3,110,017
Patented Nov. 5, 1963

3,110,017
MAGNETIC CORE MEMORY

James E. Thornton, St. Paul, Minn., assignor to Sperry Rand Corporation, New York, N.Y., a corporation of Delaware Filed Apr. 13, 1959, Ser. No. 805,878
20 Claims. (Cl. 340—174)

This invention relates to magnetic core matrices and memory assemblies and more specifically to a novel manner of winding and constructing such matrices and assembling them into an improved memory system.

Recently there has been emphasis in transistorizing all circuits in the large scale digital computing machines, including the popular ferrite memories. In transistorizing current driving circuits associated with the ferrite memory cores difficulties arise in that present day transistor elements having good switching characteristics also have relatively low maximum voltage ratings. In fact, if a large memory, for example, one having 16,384 memory registers, were to be transistorized, the voltages required to operate the memory could greatly exceed the maximum voltage ratings of the desirable transistors.

The invention solves the above problems by providing a novel way to wind and construct the ferrite matrix that is used in large high speed ferrite core memories. According to this invention the inhibit drive windings of the ferrite memories are arranged in each matrix or array such that the said inhibit drive windings are parallel to the X selection drive lines in alternate groups of arrays, and parallel to the Y drive lines in the remaining groups. The above improvement in winding magnetic core matrices reduces the interwinding capacitance between all windings, especially between the inhibit winding and the core selection drive windings. With reduced reactive loading in the memory system, less power is required to operate the memory thereby permitting lower supply voltages to be used. The improvement is such that transistor circuits may be safely utilized to operate large memory apparatus.

An additional feature of this invention is that the inhibit drive winding on a single matrix or array is terminated periodically. This splits the inhibit drive winding into separate sections which may be driven independently. The back voltage generated by self-induction in each of such sections is substantially less than the amount which would be developed if the winding were a single continuous one. For this reason, transistor components of nominal voltage ratings may be used in the inhibit driving circuitry. In addition, this split further reduces the interwinding capacitive effect.

Therefore, it is an object of this invention to provide an improved magnetic memory system.

It is another object of this invention to provide a large magnetic memory system capable of being successfully operated by transistorized circuits.

It is a further object of this invention to provide a magnetic core matrix memory system having two or more arrays or planes of magnetic cores and at least one different inhibit line for each array which is extended parallel to the X drive lines in at least one array, and parallel to the Y drive lines in at least one of the remaining arrays.

It is a further object of this invention to provide a magnetic core matrix memory system having two or more groups of arrays and at least one different inhibit line for each array extending in alternate groups parallel to the X drive lines and in the remaining groups parallel to the Y drive lines.

It is a further object of this invention to provide a magnetic core matrix or array having the inhibit line for this array intermediately terminated forming at least two independent inhibit lines such that the reactive load is reduced.

A further object of this invention is to provide balanced loading on the X and Y drive circuits thereby enabling all the X and Y circuits to be identical.

Other objects and advantages of this invention will become obvious to those having ordinary skill in the art by reference to the following detailed description of exemplary embodiments of the apparatus and the appended claims. The various features of the exemplary embodiments may be best understood with reference to the following drawings, wherein:

Figure 1:
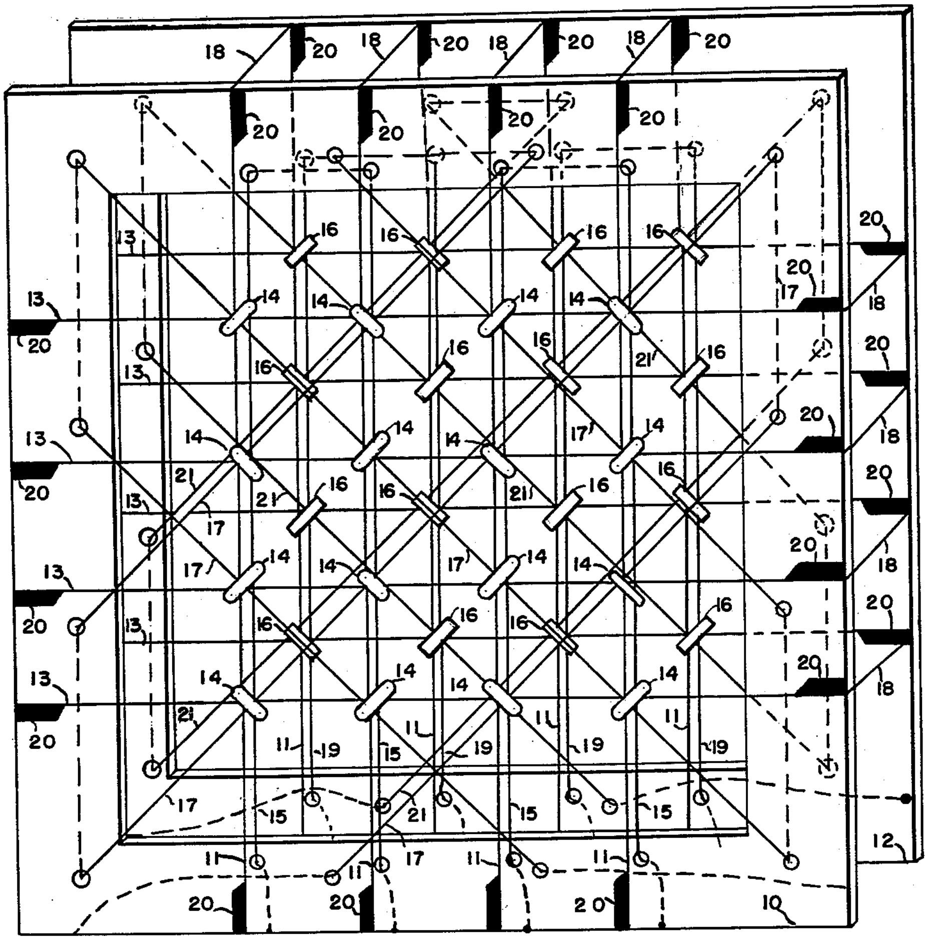
FIGURE 1 illustrates a mechanical assembly of a three dimension magnetic memory storage system consisting of two exemplary 4 x 4 ferrite core matrices wound and assembled according to the teachings of this invention.

An improved arrangement and mounting of bistable magnetic cores, whereby some of the advantages above mentioned are obtained, is illustrated in the exemplary embodiment of the invention shown in FIGURE 1. All windings which are arranged in the memory array in a fashion to form a loop have the vertex thereof formed by threading the winding through pre-drilled holes in the memory frame. Additionally other windings which leave the array and reenter the array of cores within the same memory frame are also so threaded through pre-drilled holes in the frame. Interconnections between adjacent memory planes, for example in a group containing a plurality of these planes or arrays arranged in the usual "sandwich" style, are made in the usual manner. The patent application of Andersen et al., Serial No. 771,519, filed November 3, 1958, now Patent No. 3,026,494, teaches an exemplary manner of inter-plane connection.

Each of the planes 10 and 12 of FIGURE 1 are illustrated as having sixteen different bistable memory cores, such as conventional toroidal ferrite cores, as indicated by reference characters 14 and 16, respectively, for planes 10 and 12. Each plane is arranged to form four columns of four cores each. The illustrated embodiment contains the usual four windings associated with coincident-current memory systems. However, it is to be understood that the principles and teachings of this invention may be applied to any size matrix array of core elements regardless of the memory drive and selection systems used without departing from the scope of the invention.

The conventional windings which leave and re-enter each array of cores within a given plane of cores in a coincident-current memory system are termed the inhibit and sense windings. These windings 15 and 17, respectively, for plane 10; 19 and 21, respectively, for plane 12 are inductively coupled to all cores in one plane and only one plane. The other two windings, the X drive winding 11 and Y drive winding 13, thread the cores in a single row or column of cores and thus do not re-enter the matrix to inductively couple with other cores in other rows or columns. It is understood that for proper operation, alternate X and Y drive windings carry current of opposite polarity when actuated. This will be more fully explained hereinafter with reference to FIGURE 4. Interconnections between adjacent memory planes of the X and Y drive windings are made by jumper wires 18 or may be by a connector as previously mentioned. Wires 18 are soldered to land areas 20 in each memory plane.

Figure 2:
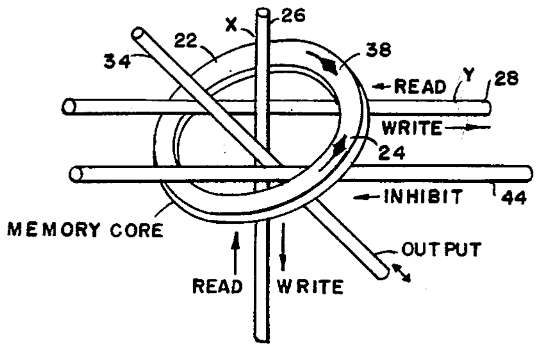
FIGURE 2 illustrates the inductive relationships between an individual memory core and the usual windings associated with a typical memory core.
Figure 3:
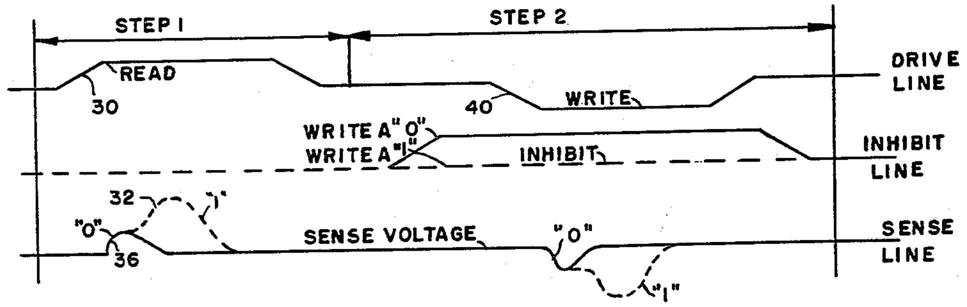
FIGURE 3 shows idealized electrical signal output waveforms associated with a typical magnetic core memory system.

The inductive relationships between an individual memory core and the four conventional windings in a memory matrix or array may best be explained with reference to the single core 22 in FIGURE 2 which may be any one of the cores in planes 10 or 12 of FIGURE 1. Operation of the memory matrix, i.e., reading and writing, is accomplished by a predetermined sequence of current pulses passing through the windings in the matrix. In a typical manner both reading and writing is accomplished in two steps. In the first step the core 22 is always set to the magnetic state which may be conveniently termed the 0 magnetic state, as indicated by flux vector 24. This step is commonly termed the "clear" or "read" step depending on whether the cycle is to read or write. The core 22 is forced to the 0 state by coincidence of two current pulses, commonly termed "half pulses," one on the X winding 26 and one on the Y winding 28. A typical half-current pulse is illustrated as pulse 30 in FIGURE 3. In accordance with known techniques a single half current is not sufficient to change the state of the core. If core 22 is made to change its magnetic state because of the described current pulses, substantial voltages are induced in all windings coupling the core. A typical waveform is shown as wave 32 in FIGURE 3 which represents the voltage induced in sense winding 34. Even if core 22 does not change its magnetic state, the magnetization of the core is driven toward magnetic saturation from the residual state by the current pulses, resulting in the small wave 36 in winding 34. This smaller signal is termed the "zero" signal and is due to the fact that the hysteresis characteristics of ferrite cores are not perfectly rectangular. Since the X and Y drive windings 26 and 28, respectively, are strung through additional cores, the half pulses transmitted by said drive windings will cause a small flux change in these additional cores, thereby inducing relatively small voltage pulses in the sense winding strung through them. These voltages are undesirable "noise" signals. The sense windings are wound such that these "noise" signals tend to cancel. This technique is well known in the memory art.

The second step of the memory cycle, i.e., the "write" cycle, is executed by two coincident current pulses on the X and Y drive windings. These latter current pulses are of opposite polarity to the "read" current pulse 30 and thus tend to force core 22 to the magnetic state indicated by flux vector 38 which may be conveniently termed the 1 magnetic state. To write a binary 1 into core 22 both current pulses, such as pulse 40 (FIGURE 3), are permitted to switch core 22 to the 1 magnetic state. To write a 0 in core 22 an "inhibit" pulse 42 is applied to inhibit winding 44 in time coincidence with the aforesaid pulses 40 in a manner and of a magnitude to oppose the magnetic field of one of the write pulses in the core 22. In this manner the switching of core 22 from the 0 magnetic state to the 1 magnetic state is inhibited and the core remains in the 0 state.

Figure 4:
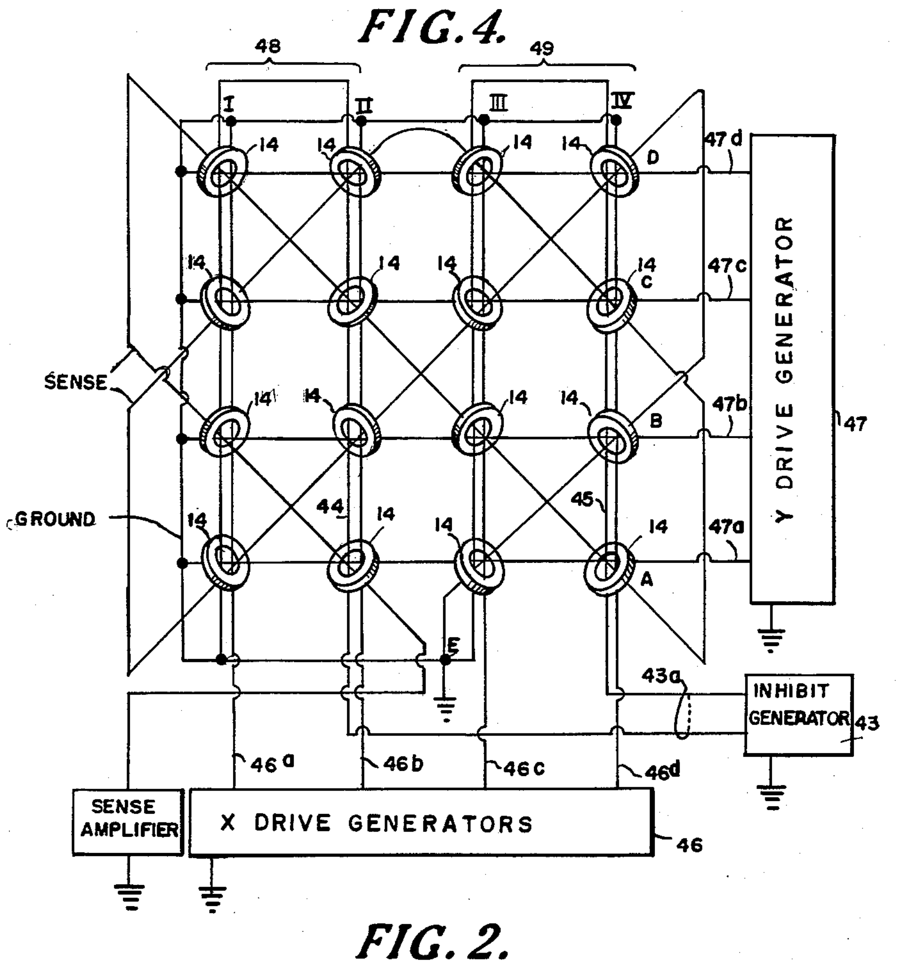
FIGURE 4 is a schematic illustration of a simplified magnetic core matrix or array with block symbols representing transistorized control circuits associated with such a matrix.

FIGURE 4 shows a simplified schematic magnetic core array corresponding to array 10 or 12 in FIGURE 1, with block symbols for control circuits, preferably transistorized, usable with such an array. The array comprises sixteen different bistable magnetic cores 14, arranged in four rows, A, B, C, D, and four columns, I, II, III, IV, said rows and columns of cores being driven by current pulses on a plurality of X drive lines *46a*, *46b*, *46c*, *46d*, from generator 46, and current pulses on a plurality of Y drive lines, *47a*, *47b*, *47c*, *47d* from generator 47. An inhibit trunk line *43a* is intermediately terminated at ground point E, forming two independent inhibit lines 44 and 45, which are driven by currents from inhibit generator 43 preferably through a selection means (not shown) activating only one of lines 44, 45 at a given time in accordance with whether the X address specifies the right or left half of the plane. The ground termination at E forms two groups of columns, group 48 and group 49, group 48 containing core columns I and II with inhibit line 44 threading only columns I and II so as to be disposed substantially physically parallel to the X drive lines *46a* and *46b*. Group 49 contains core columns III and IV with inhibit line 45 threading only columns III and IV so as to have a disposition substantially physically parallel to drive lines *46c* and *46d*. Inhibit lines 44 and 45 thread their respective columns in a manner such that the current flowing through each inhibit line in one of the columns is flowing in the opposite direction in the adjacent column. Thus the X and Y drive lines are pulsed in opposite directions on adjacent lines to perform the same operation, i.e., read or write. For example, if X drive lines *46a* and *46c* are pulsed positively to read or write, then X drive lines *46b* and *46d* would have to be pulsed negatively to perform the same function. The two primary advantages gained by the intermediate termination of the inhibit windings are now described.

The electrical load, as seen by the output of the inhibit current generator, is a combination of resistance, due to the resistivity of the winding; inductance, principally due to the inductive coupling between the winding and the magnetic cores; and capacitance, primarily as a result of physically paralleling other windings. The values of these electrical parameters vary directly with the number of cores coupled by the winding. That is, as the winding threads an increasing number of cores the length of the winding increases thereby increasing the value of the inductive, capacitive, and resistive parameters. Splitting of the inhibit drive line by intermediate terminations so that only one section is activated at one time, reduces the length of the inhibit winding thereby reducing the reactive and resistive load on the inhibit generator circuitry. This allows the use of components in the inhibit generator circuitry with adequate voltage and power ratings. Another advantage of splitting the inhibit drive winding is that the reactive effects of all the windings in a matrx are not coupled back to the X or Y drive lines through the inhibit drive line. For example, in FIGURE 4, inhibit drive line 45 parallels X drive line *46d* in the right hand column of cores. Because of this the reactive effects on the inhibit drive line will be coupled back to the X drive line *46d*. By terminating the inhibit drive line before it threads all the cores in a matrix, the reactance reflected back to X drive line *46d* is reduced. The system, presently in use with excellent results, entails the use of an inhibit drive line in each array split only at the half-way point, i.e., two groups of columns and two separately driven inhibit lines. However, the teachings of this invention do not preclude more frequent terminations and consequently more groups of columns and more inhibit lines to fruther reduce the reactive load. In general, there may be N group of columns and N inhibit lines for each array, where N is determined by the number of independent inhibit lines desired for each array. This number may for various reasons differ for each array. Further, in memoy systems of more than one array in which the inhibit windings alternatively extend parallel to the X and Y drive lines in different arrays as fully explained hereinafter, with reference to FIGURE 6, it is clear that while each array having inhibit lines parallel to the X drive line may contain N groups of columns and N inhibit lines, the remainder of arrays having at least one inhibit line in each array parallel to the Y drive lines may contain M groups of rows and M inhibit lines, where M may or may not equal N, without departing from the teaching of this invention. M is a whole number always greater than 1 and is determined in the same manner as N and may also differ in each array. For a balanced loading on the X and Y drive lines, N is the same for all planes containing inhibit lines parallel to the X drive lines; M is the same for all planes containing inhibit lines parallel to the Y drive lines and N is equal to M.

By inspection of FIGURE 4, it may be seen that due to the parallel relation between inhibit lines 44, 45, and X drive lines 46*a*, 46*b*, 46*c* and 46*d*, there is considerable interwinding capacity between these inhibit and drive lines, which will be reflected as a reactive load to the current generators supplying the above mentioned current pulses. It is apparent that the current generators must be designed to supply power to compensate for this interwinding capacitive load in large memory system which requires increased supply voltages for the current drivers. At the same time, the Y drive windings 47*a*, 47*b*, 47*c*, 47*d* in FIGURE 4, are perpendicular to inhibit windings 44, 45 and so these Y drive windings have only an insignificant capacitive load reflected by inhibit windings 44, 45. This is also shown with respect to one core in FIGURE 2 wherein inhibit line 44 is parallel to Y drive line 28 but perpendicular to X drive line 26.

Figure 5:
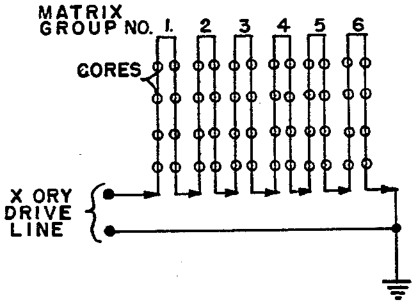
FIGURE 5 is a diagrammatic illustration showing how adjacent memory matrices or arrays are interconnected in a memory system consisting of a plurality of core matrices.
Figure 6:
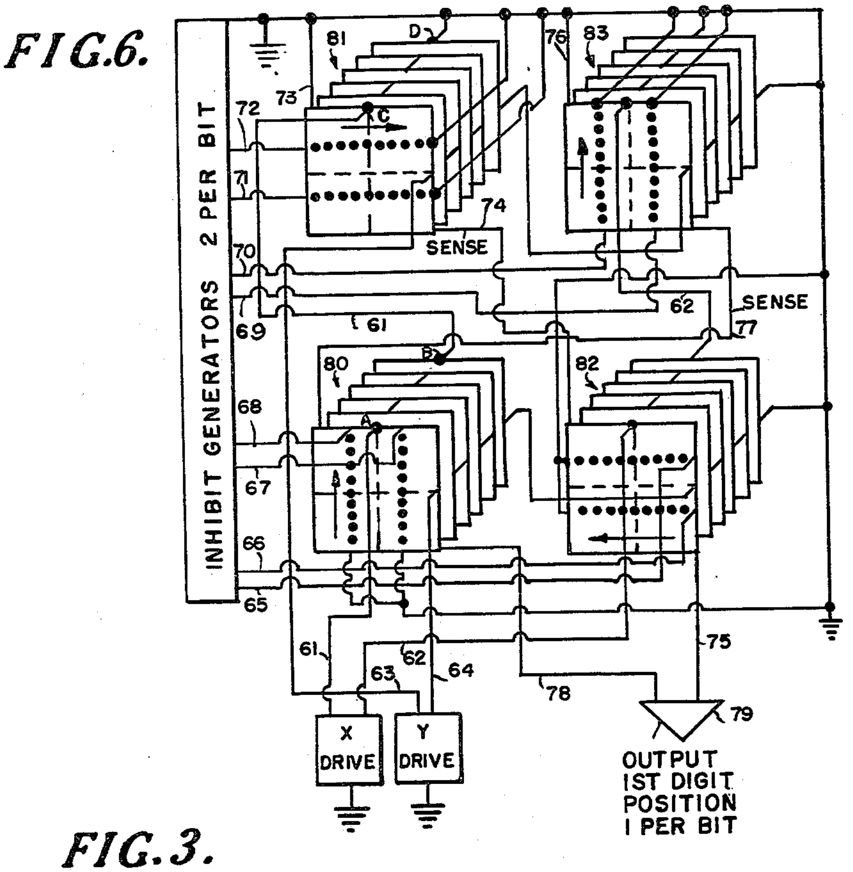
FIGURE 6 is a block schematic of a memory system constructed according to the teachings of this invention.

In FIGURE 6, 24 matrix planes or arrays are arranged in four groups of six planes each in an exemplary manner for achieving an operable memory system embodying the teachings of this invention. It should be understood that this is only one of many possible methods of forming an operable memory system and that the teachings hereof are not limited to this specific application. As typical of each of many X drive lines from the X drive generator for matrix groups 80 and 81, line 61 enters matrix group 80 at point A and runs first downwardly through a vertical column of cores in the front matrix plane of group 80. This line is continued alternately upwards and downwards through a single column of cores in the remaining five matrix planes of the group by inter-plane connections previously mentioned and as shown typically in FIGURE 1. Line 61 links all cores in the same columns on all six planes of group 80. Upon leaving group 80 at point B, line 61 continues to matrix group 81 and therein likewise runs through vertical columns of cores in all planes in that group, entering at point C, leaving at point D, and returning via a common ground path to the X drive generator. All other X drive lines (not shown for sake of clarity) for matrix groups 80 and 81 are similarly routed through those groups. Further, all the X drive lines for matrix groups 82 and 83 are also similarly routed therethrough as shown by the exemplary X drive line 62. The X and Y drive lines are always preferably so threaded regardless of the number of matrix groups or planes per group. For example, FIGURE 5 shows an exemplary X or Y drive line as it threads six matrix groups each of which have two planes of cores.

A similar path is followed by the Y drive lines, exemplified by lines 63 and 64, only in this case the lines run through horizontal rows of cores in each matrix group. Although not shown, selection means may be provided with the drive generators so that only one matrix group can be fully selected at a time. For example, if it is desired to obtain information from group 80, the X drive generator associated with the group of X lines threading the cores in group 80 and the Y generator associated with the Y lines threading the group 80 cores would be activated. A further selection means (not shown) provides for allowing the particular X and Y drive lines, say lines 61 and 64, to be connected to the respective activated generators so that only a single column and a single row of cores in each plane of group 80 respectively receives X and Y drive currents. Under such conditions, group 81 receives an X drive current and group 82 a Y drive current, but neither receives both.

Again referencing FIGURE 6, by following each pair of inhibit drive lines 65—66, 67—68, 69—70, and 71—72, it can be seen that pairs 67—68 and 69—70 are threaded through the vertical columns of cores in the front plane, respectively, of groups 80 and 83, while pairs 65—66 and 71—72 thread the horizontal rows of cores in the front plane, respectively, of group 81 and 82. (It is to be understood that for the sake of clarity, only one inhibit line pair per matrix group has been illustrated in FIGURE 6. In reality, of course, there would be an inhibit line pair for each different plane.) Therefore, the inhibit drive lines run parallel to the X drive lines in groups 80 and 83 and parallel to the Y drive lines in groups 81 and 82. In this manner, the X and Y drive generator circuits each see an equal amount of capacitive load due to the inhibit winding and the amount of such load on each is only one-half of the total capacitive load.

Preferably, each inhibit line pair above referred to e.g., 65—66, includes two independent inhibit lines, as lines 44 and 45 of FIGURE 4. However, each such pair may be considered a single inhibit line with one conductor being the ground return.

The output circuit for groups 80 and 83 will now be described. A line 73 from ground, is connected to one end of the sense winding (not shown) in the front plane of group 81. The sense winding is threaded through all the cores in one and only one plane of cores in a manner as shown in FIGURE 1. The other end of this sense winding is connected to one end of the sense winding (not shown) in the front plane of group 82 by line 74. This sense winding is also wound as in FIGURE 1. The other end of the sense line is connected to a sense amplifier by line 75. For ease of explanation and clarity of diagram, one output circuit, namely, that for the pair of front planes in groups 81 and 82 has been shown. It is understood that there are a plurality of these circuits one for each corresponding pair of planes in group 81 and 82. A similar output circuit is shown for groups 80 and 83. A line 76 from ground is connected to one end of the sense line (not shown) in the front plane of group 83. The sense winding in this plane is wound as shown in FIGURE 1. The other end of the sense winding is connected to line 77 which connects to one end of the sense winding (not shown) in the front plane of group 80. This sense winding is also wound as in FIGURE 1. The other end is connected by line 78 to sense amplifier 79. Although only one output circuit for groups 80 and 83 has been shown, it is understood that each corresponding pair of planes in groups 80 and 83 has a similar output circuit.

Thus, it is apparent that there is provided by this invention systems in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. In a memory system which includes at least two arrays of bistable magnetic cores with the cores in each array being arranged in a plurality of first and second sets, each core being common to a different first and second set, a plurality of first drive lines for the first sets of cores in each array, the respective first drive lines for corresponding first core sets respectively of said two arrays being serially connected, a plurality of second drive lines for the second sets of cores in each array, said first and second drive lines within each array being substantially non-parallel, and at least one different inhibit line for each array, the improvement comprising in one of said arrays the disposition of an inhibit line therefor being substantially physically parallel substantially only to at least part of the said plurality of first drive lines therein, and in at least one other of said arrays the disposition of an inhibit line therefor being substantially physically parallel substantially only to at least part of the said plurality of second drive lines therein.

2. A memory system as in claim 1 wherein at least said one array contains N groups of first sets of cores and N inhibit lines respectively therefor, the disposition of said N inhibit lines being substantially physically parallel substantially only to the first drive lines contained in a respective one of said groups of first sets.

3. A memory system as in claim 2 wherein at least said one other array contains M groups of second sets of cores and M inhibit lines respectively therefor, the disposition of said M inhibit lines being substantially physically parallel substantially only to the second drive lines contained in a respective one of said groups of second sets.

4. In a memory system which includes more than two arrays of bistable magnetic cores with the cores in each array being arranged in a plurality of first and second sets, each core being common to a different first and second set, a plurality of first drive lines for the first sets of cores in each array respectively serially connected from array to array and extending within each said array in a first direction, a plurality of second drive lines for the second sets of cores in each array serially connected between arrays and extending within each array in a second direction different than the said first direction therein, and at least one different inhibit line for each array, the improvement comprising in at least two of said arrays the disposition of an inhibit line for each such array being substantially physically parallel substantially only to at least part of the said plurality of first drive lines therein, and in at least one of the remainder of said arrays the disposition of an inhibit line therefor being substantially parallel substantially only to at least part of the said plurality of second drive lines therein.

5. A memory system as in claim 4 wherein at least one of said arrays contains N groups of first sets of cores and N inhibit lines respectively therefor, the disposition of said N inhibit lines being substantially physically parallel substantially only to the first drive lines contained in a respective one of said groups of first sets.

6. A memory system as in claim 4 wherein more than one of said arrays contains N groups of first sets of cores and N inhibit lines respectively therefor, the disposition of said N inhibit lines being substantially physically parallel substantially only to the first drive lines contained in a respective one of said groups of first sets.

7. A memory system as in claim 6 wherein at least one array in the remainder of said arrays contains M groups of second sets of cores and M inhibit lines respectively therefor, the disposition of said M inhibit lines being substantially physically parallel substantially only to the second drive lines contained in a respective one of said groups of second sets.

8. A memory system as in claim 6 wherein more than one array in the remainder of said arrays contains M groups of second sets of cores and M inhibit lines respectively therefor, the disposition of said M inhibit lines being substantially physically parallel substantially only to the second drive lines contained in a respective one of said groups of second sets.

9. A memory system as in claim 6 wherein the remainder of said arrays contains M groups of second sets of cores and M inhibit lines respectively therefor, the disposition of said M inhibit lines being substantially physically parallel substantially only to the second drive lines contained in a respective one of said groups of second sets.

10. A memory system as in claim 4 wherein the number of arrays containing the disposition of an inhibit line substantially physically parallel substantially only to at least part of the first drive lines therein is equal to the number of arrays containing the disposition of an inhibit line substantially physically parallel substantially only to at least part of the second drive lines therein.

11. In a memory system which includes a plurality of arrays of bistable magnetic cores with the cores in each array being arranged in a plurality of first and second sets, each core being common to a different first and second set, a plurality of first drive lines for the first sets of cores in each array, a plurality of second drive lines for the second set of cores in each array, said arrays being arranged in at least two groups, each of said first drive lines of any array in any of said array groups being serially connected with each corresponding first drive line of each array in the same array group to form a plurality of first drive line sets respectively for said groups and extending nonparallel within its array to each first drive line therein, each said second drive line of any array in any of said array groups being serially connected with each corresponding second drive line of each array in the same array group to form a plurality of second drive line sets respectively for said groups, corresponding drive lines of at least one of said first and second drive line sets for at least said two groups of arrays being serially connected, and at least one different inhibit line for each array, the improvement comprising in at least one of said groups, the disposition of an inhibit line for each array contained in said one group substantially parallel substantially only to at least part of the first drive lines therein, and in at least one other of said groups, the disposition of an inhibit line for each array contained therein substantially physically parallel substantially only to at least part of the second drive lines therein.

12. A memory system as in claim 11 wherein said arrays are arranged in more than two groups of arrays, and wherein, in at least one other of said groups, the disposition of a different inhibit line for each array therein is substantially physically parallel substantially only to at least part of the first drive lines therein.

13. A memory system as in claim 12 wherein in the remainder of said groups, the disposition of a different inhibit line for each array therein is substantially physically parallel substantially only to at least part of the second drive lines therein.

14. A memory system as in claim 13 comprising in alternate ones of said groups, the disposition of a different inhibit line for each array therein being substantially parallel substantially only to at least part of the first drive lines therein, and in the remaining ones of said groups, the disposition of a different inhibit line for each array therein substantially physically parallel substantially only to at least part of the second drive lines therein.

15. A memory system as in claim 14 wherein at least one of the arrays in said alternate groups contains N groups of first sets of cores, and N inhibit lines respectively therefor, the disposition of said N inhibit lines being substantially physically parallel substantially only to the first drive lines contained in a respective one of said groups of first sets.

16. A memory system as in claim 14 wherein more than one of the arrays in said alternate groups contains N groups of first sets of cores and N inhibit lines respectively therefor, the disposition of said N inhibit lines being substantially physically parallel substantially only to the first drive lines contained in a respective one of said groups of first sets.

17. A memory system a in claim 14 wherein each of the array in said alternate groups contains N groups of first sets of cores and N inhibit lines respectively therefor, the disposition of said N inhibit lines being substantially physically parallel substantially only to the first drive lines contained in a respective one of said groups of first sets.

18. A memory system as in claim 17 wherein at least one of the arrays in said remaining groups contains M groups of second sets of cores, and M inhibit lines respectively therefor, the disposition of said M inhibit lines being substantially physically parallel substantially only to the second drive lines contained in a respective one of said groups of second sets.

19. A memory system as in claim 17 wherein more than one of the arrays in said remaining groups contains M groups of second sets of cores, and M inhibit lines respectively therefor, the disposition of said M inhibit lines being substantially physically parallel substantially only to the second drive lines contained in a respective one of said groups of second sets.

20. A memory system as in claim 17 wherein each of the arrays in said remaining groups contains M groups of second sets of cores, and M inhibit lines respectively therefor, the disposition of said M inhibit lines being substantially physically parallel substantially only to the second drive lines contained in a respective one of said groups of second sets.

References Cited in the file of this patent

UNITED STATES PATENTS

| | | |
|---|---|---|
| 2,784,391 | Rajchman et al. | Mar. 5, 1957 |
| 2,802,203 | Stuart-Williams | Aug. 6, 1957 |
| 2,889,540 | Bauer et al. | June 2, 1959 |
| 2,902,677 | Counihan | Sept. 1, 1959 |
| 2,907,986 | Rajchman | Oct. 6, 1959 |
| 2,911,631 | Warren | Nov. 3, 1959 |
| 2,915,740 | Ricketts | Dec. 1, 1959 |
| 2,929,050 | Russell | Mar. 15, 1960 |
| 2,937,364 | Rosenberg | May 17, 1960 |
| 2,947,977 | Block | Aug. 2, 1960 |